(12) United States Patent
Cameron (10) Patent No.: US 8,055,590 B2
(45) Date of Patent: Nov. 8, 2011

(54) METHOD AND SYSTEM FOR REMOTELY MONITORING METERS

(75) Inventor: Richard Neill Cameron, Le Rouret (FR)

(73) Assignee: Accenture Global Services GmbH (CH)

( * ) Notice: Subject to any disclaimer, the term of this patent is extended or adjusted under 35 U.S.C. 154(b) by 1566 days.

(21) Appl. No.: 11/102,593

(22) Filed: Apr. 8, 2005

(65) Prior Publication Data

US 2005/0246295 A1  Nov. 3, 2005

(30) Foreign Application Priority Data

Apr. 8, 2004  (EP) .................................. 04300198

(51) Int. Cl.
 G01R 11/56 (2006.01)
 G01R 21/133 (2006.01)
 G06F 17/00 (2006.01)
 G01N 21/00 (2006.01)
 G06K 9/18 (2006.01)
 G03G 15/00 (2006.01)

(52) U.S. Cl. ......... 705/412; 356/443; 382/182; 399/158

(58) Field of Classification Search .................... 705/412
 See application file for complete search history.

(56) References Cited

U.S. PATENT DOCUMENTS

| | | | |
|---|---|---|---|
| 6,522,889 B1 | 2/2003 | Aarnio | |
| 6,985,173 B2 * | 1/2006 | Shan et al. | 348/160 |
| 6,985,176 B2 * | 1/2006 | Noguchi | 348/208.11 |
| 2003/0033176 A1 * | 2/2003 | Hancock | 705/6 |
| 2004/0006424 A1 * | 1/2004 | Joyce et al. | 701/207 |
| 2004/0032504 A1 | 2/2004 | Shan et al. | |
| 2004/0259526 A1 * | 12/2004 | Goris et al. | 455/406 |
| 2005/0035208 A1 * | 2/2005 | Elliot et al. | 235/472.01 |
| 2005/0035877 A1 * | 2/2005 | Kim | 340/870.02 |
| 2005/0063566 A1 * | 3/2005 | Beek et al. | 382/115 |
| 2005/0162523 A1 * | 7/2005 | Darrell et al. | 348/211.2 |

FOREIGN PATENT DOCUMENTS

DE  199 62 954 A1  6/2001

OTHER PUBLICATIONS

European Search Report, dated Nov. 3, 2004.

* cited by examiner

Primary Examiner — John Hayes
Assistant Examiner — David J Clark
(74) Attorney, Agent, or Firm — Brinks Hofer Gilson & Lione (57) ABSTRACT

Methods and systems remotely monitor a current value of a meter display. A picture of the display is taken with a camera equipped portable communication device. The picture is sent through the portable communication device and associated infrastructure to a processing system. The processing system receives and stores the picture and, optionally, verification data, imaging location data, and other data, in a datastore. The processing system processes the picture to obtain a current value of the meter and authenticates the sender and/or the meter using the verification data and/or location data.

27 Claims, 4 Drawing Sheets

METHOD AND SYSTEM FOR REMOTELY MONITORING METERS

PRIORITY CLAIM

This application claims the priority benefit of European Patent Application 04300198.1 filed Apr. 8, 2004, titled Method and System for Remotely Monitoring Meters.

BACKGROUND

1. Technical Field

The present invention relates to a system and method for remotely monitoring meters and other displays. More particularly, this invention relates to remotely monitoring utility meters such as electricity, water, and gas meters, industrial meters such as tank level meters, mobile meters such as odometers, or any other type of meter.

2. Background Information

Meter monitoring, particularly for utility meters, is commonly accomplished by manually reading meter digits or other indicators such as dials, needles, or bars. The read value is entered in a computerized system for further processing including statistical processing, invoicing, and other processing. A professional worker for the utility company typically monitors the meter, while in other scenarios the consumer may monitor the meter. In the later case, problems of fraud in communicating false or inadvertently incorrect values may arise.

Automatic remote monitoring systems also exist. Such systems require sophisticated dedicated equipment on the meter side, special network conditioning components, and other communication elements. For example, electricity utility meters may be provided with transmission circuitry, like modems, to communicate with a central server that periodically collects meter values. Such remote automatic monitoring systems alleviate the drawbacks of manual monitoring, including inaccuracies, whether voluntarily or not, in reading and entering meter values. However, automated monitoring requires specific costly equipment on the meter side and is not widely deployed. Remote automated meter reading cannot be employed with legacy, non-electronic, or non-upgradeable meters. These meters represent a large majority of the installed meter base and include, for example, old utility meters that therefore require manual monitoring.

An additional problem is that, in most applications, the meter value must be verified as the right meter value for a specific customer. For example, the meter value may need verification as the meter value of the correct house. Verification requires extra time and expense for a specific manual check and authentication process. The verification process may include looking for a meter identifier and an associated street residence, or business address, and reporting back to the metered service provider.

A need has long existed for improved meter monitoring that address the drawbacks noted above and other previously experienced.

BRIEF SUMMARY

This invention provides a method and system in which the information displayed by a meter is captured (e.g., photographed) and transmitted to a remote computerized system. The processing system analyzes the picture to determine a current value of the meter display. Further, the processing system may identify the meter using the geographical location of the camera at the time the picture of the meter is taken.

The media capabilities of mobile communication devices, especially of mobile phones, may be employed to capture the picture and transmit the picture to the processing system. For example, a mobile phone equipped with a camera may acquire the picture and transmit the picture to the processing system. The mobile phone may transmit the picture through a Multimedia Messaging Service (MMS) or other data service supported by the communication network and service provider. The resolution of modern mobile phone cameras is sufficient for determining the current value of the meter display.

The camera may send one or more pictures of one or more meter displays to be monitored. The processing system receives the pictures for interpretation by image processing techniques to determine the current value of the meter display. Suitable image processing techniques are described in, as examples:

"*Locating and Recognizing Text in WWW Images*", Lopresti Daniel, Jiangying Zhou, Information Retrieval, v. 2 n. 2-3, pp. 177-206, May 2000;

"*Foreground/background segmentation of color images by interaction of multiple cues*", Huang Q., Dom B., Steele D., Ashley J. and Niblack W., Proceedings of the Conference on Computer Vision and Pattern Recognition, pp. 246-249 (1995);

"*N-Tuple features for OCR revisited*", Jung D., Krishnamoorthy M., Nagy G., and Shapira A., IEEE Transactions on Pattern Analysis and Machine Intelligence (1996); and "*Robust retrieval of noisy text*", Lopresti D., Proceedings of the Third Forum on Research and Advances in Digital Libraries, Washington, D.C., pp. 76-85 (1996).

The processing system may apply these and other techniques for processing the picture of the meter display. Accordingly, the processing system may extract, from digits of a counter, needles of dials, bars, or other indicia in the picture, a digital value representing the current value indicated by the meter display.

A geographical location process provides location data for the device taking the picture of the meter display. The geographical location process may employ any location technique for mobile devices, including the assisted Global Positioning System (aGPS), time differential or delay of arrival (TDOA), or other signal, strength, and/or timing analysis approaches alone or in combination. The location techniques may locate the mobile device down to meters of accuracy or better. Alternatively, a non-core network location technique may be applied, such as a BLUETOOTH™ GPS receiver that gives the location and time to the mobile device as the device is about to send the picture to the communication infrastructure backend.

Thus, the system localizes the mobile device and determines an imaging location from which the picture was taken. The localization has the precision of whichever technique is available for use within the wireless service provider network, the precision of the technique used in conjunction with standalone BLUETOOTH™ GPS receivers, or the precision of any other selected localization techniques.

The aGPS location or a network cell identifier may locate a meter with respect to the distance separating two meters to be monitored. The cell identifier location may be completed by the identification of the mobile device sending the picture. The device identifier may include a phone number, a unique code such as the 15 digit International Mobile Equipment Identity (IMEI) number, personal identification number (PIN) or other identifiers. The mobile device may also compliment the device identifier with a picture of the sender, fingerprint, voice, or other biometric data. The processing system may match the biometric data against a list of identifiers of authorized meter reading data providers for the given meter.

For example, the mobile device may provide a facial picture of the mobile device operator. The processing system may then process facial biometrics to validate the operator. The biometrics may also authenticate the operator, and metadata extraction of injuries or other visually determinable characteristics may be historically recorded, recognized, trended, and employed for authentication.

The meter, such as a residential or industrial utility meter, may remain at a fixed location. The fixed location may be pre-stored in the processing system, for example, in a customer datastore. The processing system may employ a reverse geocode lookup to translate geographical latitude and longitude into a matching or nearly matching street address or address range. The address or address range may be compared to existing customer addresses in the customer datastore or other database. Thus, the processing system may automatically associate the determined current value of the meter display to the customer record that is the closest match.

The meter, such as a vehicle odometer, may be mobile. The processing system may also localize the mobile meter. For example, the processing system may receive GPS location data for the vehicle that reveals the location of the vehicle (and thus the odometer). The processing system may then compare the location of the mobile device and of the mobile meter to determine whether the locations match, are within a pre-determined geographical area of one another, or are otherwise consistent. Alternatively, the processing system may associate one or more fixed locations with the mobile meter. The fixed locations may be locations where the mobile meter is expected to be. For example, the fixed expected locations for a vehicle may include the location of the owner's garage or home, office, or other location.

The processing system may accept, analyze, and determine the current value of the meter display when the imaging location matches one of the fixed expected locations. Additionally, the processing system may authenticate the picture, the device operator, and/or the meter using supplemental characteristics of the meter, the meter's environment, and/or the operator. For example, the processing system may associate an odometer with the correct car model dashboard or the correct odometer type or style for that model of car. Validation of the picture may include matching the dashboard or odometer characteristics to the associated supplemental characteristics, particularly when the customer sends his own pictures.

BRIEF DESCRIPTION OF THE DRAWINGS

The foregoing and others purposes, features, aspects and advantages of the invention will become apparent from the following detailed description of embodiments, given by way of illustration and not limitation with reference to the accompanying drawings.

DETAILED DESCRIPTION

Figure 1:
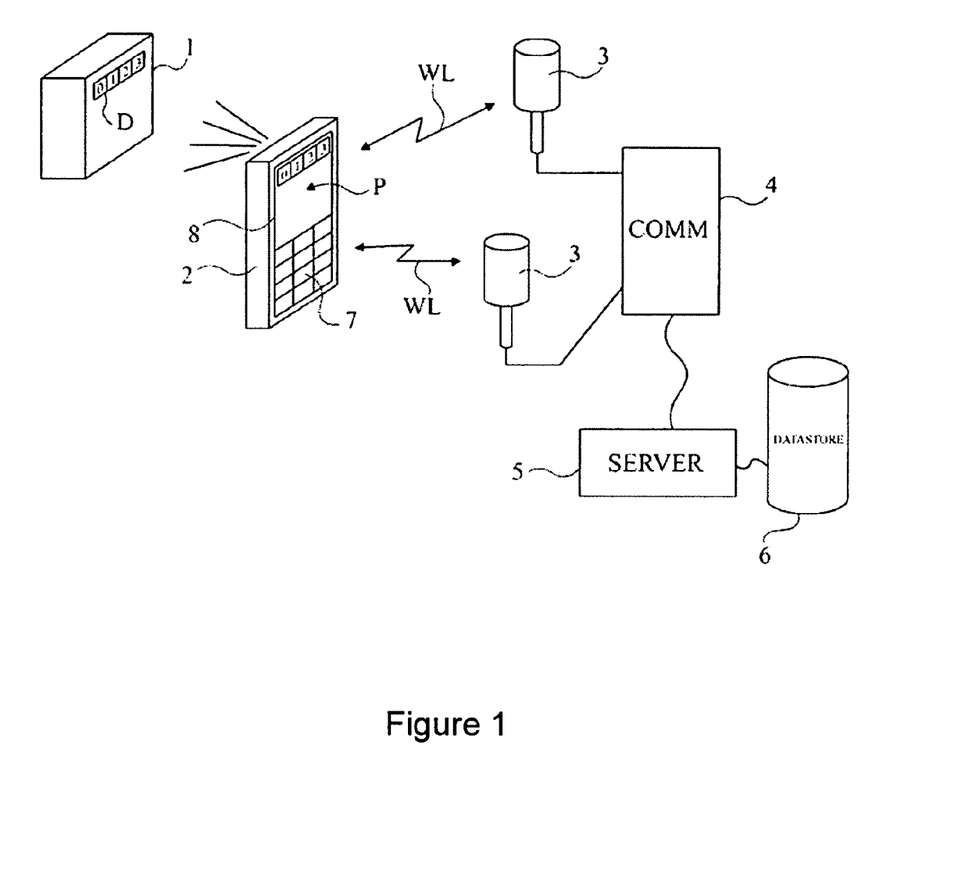
FIG. 1 illustrates a meter monitoring system.

This invention is applicable to any alphanumeric display, whether digital or analog, provided on any type of meter. Any downstream processing system may process the determined meter value for billing, tracking, reporting, or any other purpose. FIG. 1 illustrates a meter monitoring system which may accept and process meter reading from g as or electricity utility meters, as examples.

As shown in FIG. 1, a picture P of a display D of a meter 1 (here a decimal counter) is taken with a mobile phone 2. Instead of the mobile phone 2, any other camera-equipped communication device may capture the picture P. The communication device may be a wireless communication device that communicates data over a cellular infrastructure (e.g., a 2G, 2.5G, 3G, or 4G infrastructure) employing packet switched routing, circuit switched routing, or other data routing techniques. In addition to or as an alternative to the picture P, the phone 2 may capture other meter reading data, such as touch tone input, voice input, or other input that represents, captures, or encodes the meter reading.

After the phone 2 captures the picture P, the phone 2 may transmit the picture P to a processing system (e.g., the server 5). The server 5 may represent a processing system implemented at the gas or electricity provider. The picture transmission may occur over a Multimedia Messaging Service (MMS) immediately after the picture P is taken, while in the vicinity of the meter, or at another time. The user may be a customer of the metered service or another individual. When creating the MMS message, the user may check the picture P appearing on the display 8 of the phone 2.

The MMS image transfer may be made through wireless links WL to access point(s) 3 of a communication network. Each access point (e.g., a cellular base station) may define a communication cell and a geographical area covered by the Radio Frequency (RF) field radiated by the base station antenna. The access points 3 relay the communication (e.g., the meter reading data and verification data discussed below) to a communication unit 4. The communication unit 4 is linked to a processing system such as the application server 5. The server 5 may host MMS processing hardware and software. The communication unit 4 may include any combination or wireless or hardwired communication infrastructure.

The MMS message may include, in any combination, the picture P, an identification of the sender's phone number, a 15 digit International Mobile Equipment Identifier (IMEI) number (or other identifier), a picture of the sender, fingerprint data, voiceprint data, or other sender biometric data, numeric data typed on the keypad of the phone 2 that may represent the meter reading, meter identification, or other information, attachments such as voice captures or other data, a current cell identifier, or other data. Alternatively or additionally, the communication service provider may provide an approximate geographical localization of the mobile phone 2 when sending the MMS message. The geographical localization may include Global Position System (GPS) data (e.g., obtained from BLUETOOTH™ GPS receivers), Assisted Global Positioning System (aGPS) data, or other location data.

The server 5 may represent a processing system of the metered service provider, such as an electricity company, insurance company, or other metered service provider. In one implementation, the server 5 compares an estimated location of the mobile phone 2 when the picture P was taken (i.e., an imaging location) with respect to a stored fixed location of the meter 1. The server 5 may calculate the estimated location or may receive the estimated location from a location provider. The fixed location of the meter 1 is stored in a datastore 6 to which the server 5 is linked or which the server 5 may access locally or remotely.

The comparison identifies the meter 1, preferably without any additional identification such as the typing of a serial number or other meter identifier on the keyboard 7 of the mobile phone 2. The server 5 may establish tolerances in determining whether to accept the location match against the location of the mobile phone 2. As examples, the tolerances may require locations to be within 0-100 meters of each other, 0-50 meters of each other, or 0-20 meters of each other. When the location data that accompanies the received MMS message is granular enough (e.g., less than 50-100 meters), the server 5 may initiate a reverse lookup (e.g., a geocode or other location data to street address lookup) to find the closest matching meter in the datastore 6.

The type of location data may vary widely. For example, the location data may be latitude and longitude coordinates. Alternatively, distance and orientation, accelerometer or magnetic heading generated paths with respect to a fixed point, or other location data may be used that identify geographical or 3D locations in space.

The server 5 also may check a list of authorized transmitters of meter reading data associated with the meter 1. Accordingly, the server 5 may determine whether the mobile phone 2 which has sent the MMS is an authorized reporter of meter reading data for the meter 1. Unauthorized meter readings may be discarded, reported, or otherwise processed.

The server 5 interprets the picture P (or other meter reading data) to obtain an alpha-numerical or meta-data digital value corresponding to the indication shown on the display D of the meter 1 (e.g., a digital value corresponding to the meter's current value). The interpretation may employ image processing methods for isolating a part of the picture P corresponding to the display and employ recognition methods based on predetermined models of acceptable displays. The interpretation may also perform a segmentation to identify text or other indicia in the picture P and obtain a digital value for the displayed value of the meter.

If the interpretation step leads to a valid value for the current value of the meter, the server 5 may send back a 'valid acknowledgment' to the mobile phone 2. If the server 5 is unable to obtain a valid meter value, if the mobile phone 2 is not authorized or authenticated, or if the location check is negative (e.g., the phone location does not match a meter), the server 5 may send back an 'invalid acknowledgement' to the mobile phone 2. The server 5 may send the acknowledgements using a short text message through the Short Messaging System (SMS) or a General Packet Radio Service (GPRS) confirmation to the application on the mobile phone 2.

Once a valid value representing the current value of the display D of the meter 1 is stored in the datastore 6, the server 5 may communicate the current value to any other downstream processing system. The downstream processing system may prepare billing, may track usage statistics, may archive meter readings, or may take any other actions based on the current value.

Figure 2:
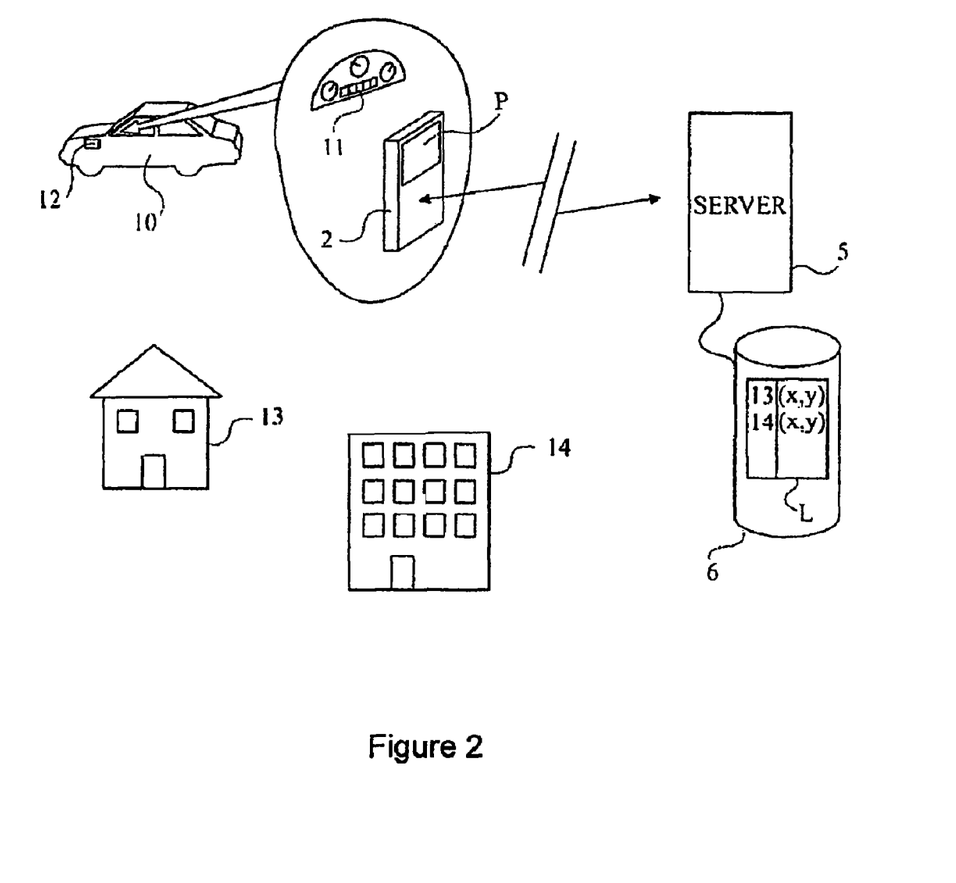
FIG. 2 illustrates a second implementation of a meter monitoring system.

FIG. 2 illustrates a second implementation of a meter monitoring system applied to a monitoring a mobile meter. As shown in FIG. 2, the mobile meter is an odometer 11 of a vehicle, shown as the car 10. In such an application, the number displayed by the meter 11 can be used, for example, by an insurance company for many reasons, for example to periodically adapt the amount of the insurance to be paid by the driver according to the distance the car 10 is driven.

Both the meter 11 to be monitored and the communication device (the mobile phone 2) are mobile. Hence, the meter monitoring system may establish a correspondence between the meter 11, the car 10, and/or the driver. As one alternative, the car 10 itself may be located, for example, by a locating system such as a Global Positioning System (GPS) 12, a surveying or tracking system (such as a LOJACK(™) tracking system), or other systems. The server 5 receives the location information for both the mobile phone 2 sending the picture and the car 10. The server 5 compares the two locations and accepts the picture if the locations, extracted metadata, or other accompanying information is consistent with known parameters that characterize the car 10, the meter 11, and/or the user.

As one example, the processing system may store images, identifiers, or other data characterizing the car 10, the meter 11, or other environments in the datastore 6. The characterizing data may represent dashboards, odometers, speedometers, or other features of the car 10 and/or features of the environment such as trees, buildings, topographical features, shadows, or other features that are expected to be present at any given time at the imaging location. The features may be features that were factory installed in cars of the same make and model. Validation of the meter reading data may include matching the dashboard or odometer characteristics to the associated expected characteristics stored in the datastore 6.

As a second alternative, the meter reading data, such as the picture P, is accepted by the server 5 when the picture P is sent from one or more predetermined geographical locations. To that end, the server 5 may store fixed locations such as the car owner's house 13, office 14, or other locations in the server datastore 6. The fixed locations may be stored in a list L as location data such as coordinate data (e.g., X, Y; latitude, longitude; or distance, direction data), as a formula (e.g., an elliptical formula) defining a geographical area, a location and a boundary around the location, or in other manners.

The fixed locations establish the valid locations for the meter 11. In addition to the verification processing described above, the server 5 also may determine whether the determined meter location matches any of the fixed locations in the list L. When the determined meter location is not on the list L, the server 5 may discard the meter reading data, report the lack or correspondence, or take other actions.

Businesses often incur significant labor costs to carry out the meter reading that supports customer billing, resource tracking, and other meter administration. Regardless, the meter reading labor cannot provide a continuously updated and accurate reading for each meter. At best, the meters are read at discrete intervals which may be lengthy. As a result, businesses may issue invoices with estimated charges that reflect trended or expected usage. Thus, when the meter reader finally reads the associated meter, the business may need to issue a credit, an additional invoice, or take other costly administrative actions.

A business may provide incentives to customers to monitor their own meters. The business thereby supplements or supplants the meter reading labor that the business traditionally employs. For example, a business may provide a low cost camera-equipped wireless communication device (e.g., a cell phone, PDA, or pager) to each customer. As another example, the business may additionally or alternatively provide a discount for the metered service (e.g., a discount on electricity) to the customer. Each customer may then image their meter on any agreed schedule (e.g., once per month) and transmit the meter reading data to the business. The continued operation of the communication device may be contingent upon customer cooperation with providing meter readings, or with any other provision specified in an agreement between the customer and the businesses.

The business may also partner with the underlying wireless infrastructure provider or other supporting businesses. For example, an electric company may partner with a cellular service provider. The electric company customers may enlarge the cellular service provider's customer base, in return for a portion of the revenue obtained for providing communication bandwidth to the new customers. Any entity in the partnership may provide incentives to the customer. As one example, the electric company may provide a low cost cell phone to the customer, while the cellular service provider may provide reduced calling rates, free minutes or hours, or other incentives.

The meter reading technology may also be employed in industrial settings, such as in a manufacturing facility. For example, an industrial fuel supplier may be responsible for checking tank levels on-site at the manufacturer, refilling the tanks, and billing the manufacturer for the fuel. In addition to or as an alternative to their own meter reading labor, the fuel supplier may provide incentives to the manufacturer to read their own tank meters. The fuel supplier may then more responsively monitor and react to the fuel needs of the manufacturer. The fuel supplier may also store meter readings to provide records for audits, to assist with compliance with regulatory requirements, or for other reasons.

Any meter reading image processing system may establish a level of trust for a customer who submits the meter images. In one implementation, the trust level determines the amount of meter reading data, verification data, or other data that the processing system requires the customer to submit. Starting at an initial trust level, the processing system may require the customer to provide an image of the meter, biometric verification data, and/or other verification data. Over time, the processing system may increase the level of trust. For example, as the customer consistently provides authenticated meter readings, the processing system may increase the trust level. At any given level, the processing system may require more, less, or different verification data. As one example, at a highest level of trust, the processing system may require the customer to submit no more than touch tone input representing the meter value. In other words, at certain trust levels, no verification data may be required.

Figure 3:
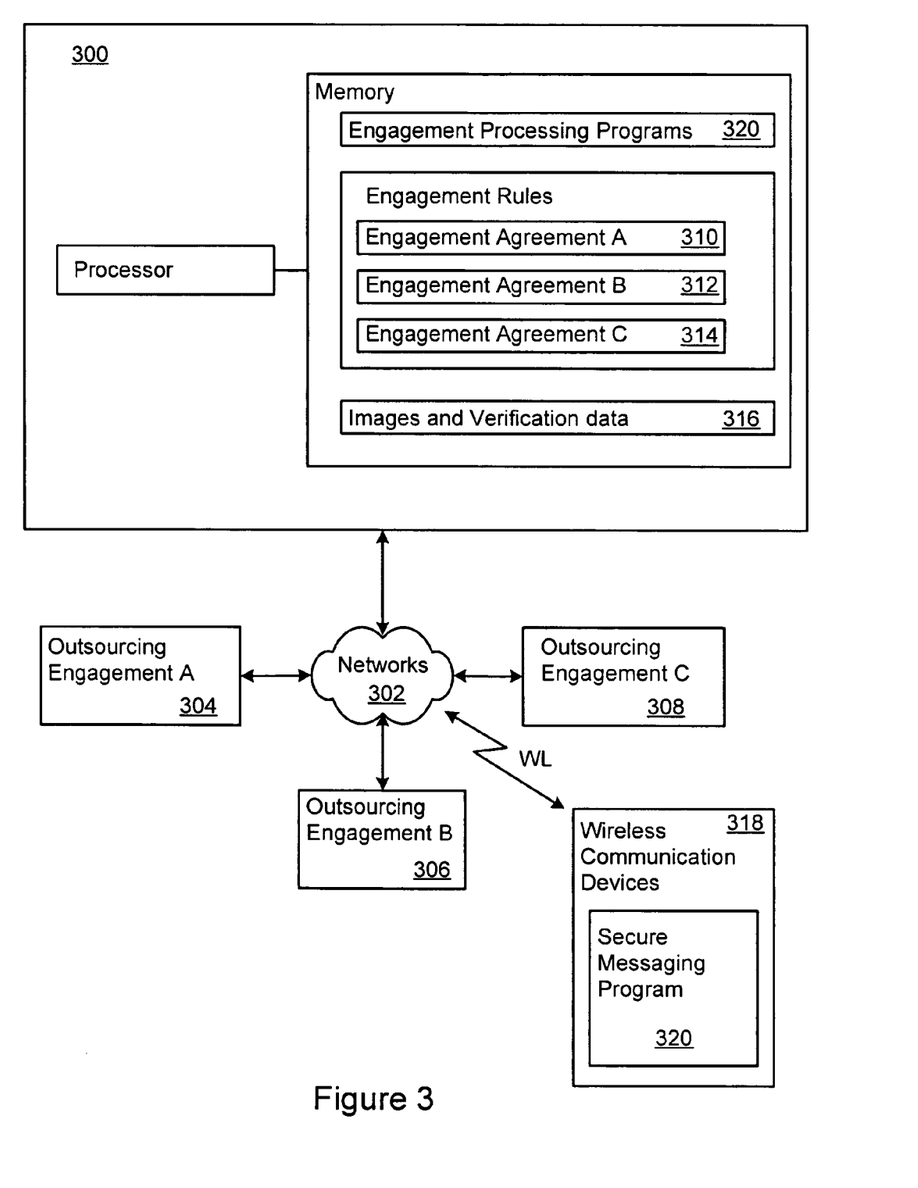
FIG. 3 shows an outsourcing center that processes meter images.

FIG. 3 shows an outsourcing center 300 connected through one or more networks 302 to outsourcing engagements 304, 306, and 308. The outsourcing center 300 may provide each engagement 304-308 with meter reading, billing, and/or reporting services as defined by the outsourcing agreements 310, 312, and 314. To that end, the outsourcing center 300 may store and process meter reading data, (e.g., meter images) and verification data 316 received from the outsourcing engagement's customers, from the engagements 304-308, or from other parties. Customers may submit the image and verification data using the wireless communication devices 318.

Engagement processing programs 320 process the meter reading data and verification data 316 and process, track, and report meter reading, billing, and statistical data to the engagements 304-308. The processing programs 320 perform processing according to rules established by or derived from the engagement agreements 310-314. The outsourcing center 300 processes meter readings for any number of the engagement 304-308 customers. According, the outsourcing center 300 may provide the benefits of a shared cost center to the engagements 304-308 and other potential engagements.

As shown in FIG. 3, the wireless communication device 318 may include a secure messaging program 320. The secure messaging program 320 may include instructions that capture and transmit images and verification data directly to any processing system, including the outsourcing center 300. The secure messaging program 320 may also apply encryption (e.g., public key encryption) to all of or any part of the transmitted data. The processing system may thereby protect against customer image downloading, image modification, and uploading and transmission of altered images or verification data to the processing system.

Figure 4:
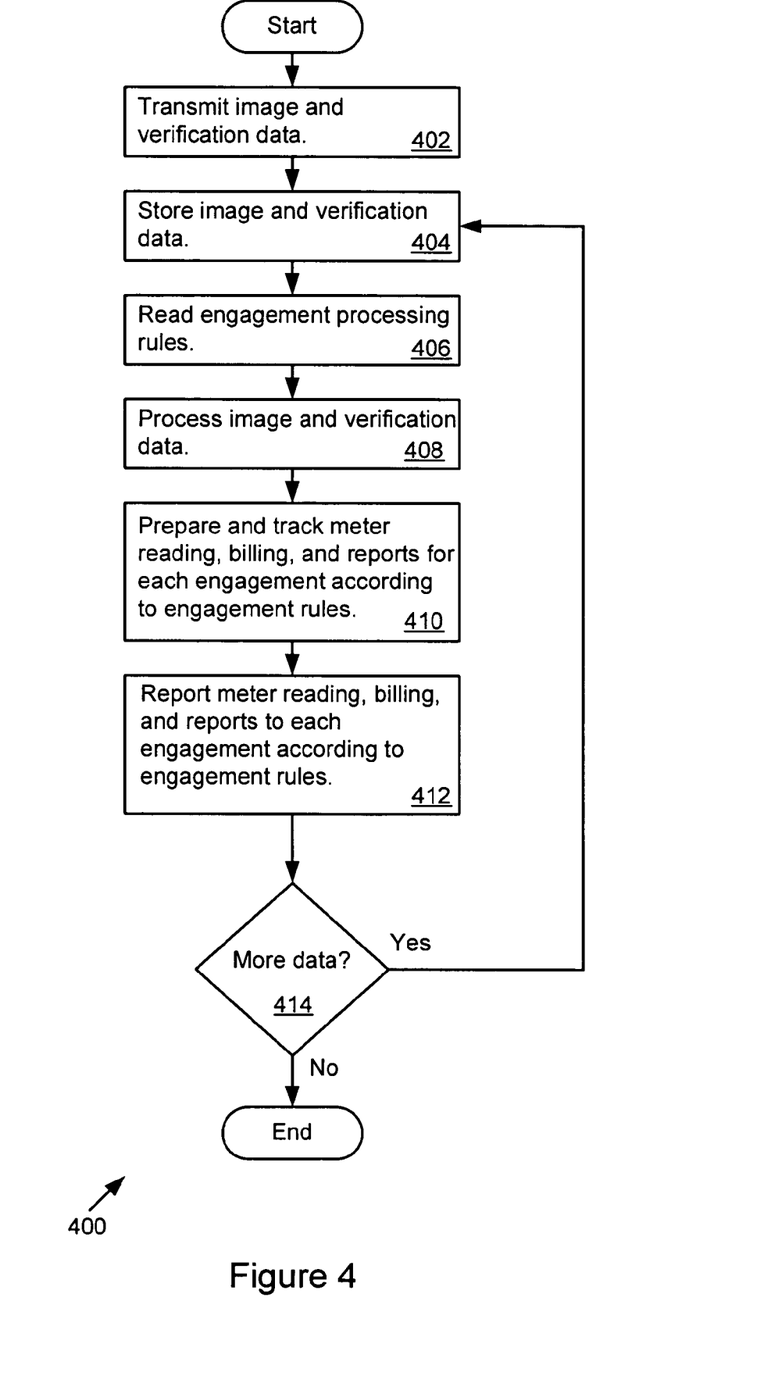
FIG. 4 shows a flow diagram of acts that may be taken to process meter reading data and verification data.

FIG. 4 shows a flow diagram of the acts 400 that may be taken to process image and verification data. Wireless communication devices transmit meter reading data such as images, touch tone data, or other data, as well as verification data to the processing system (Act 402). The processing system stores the meter data and the verification data (Act 404).

When the processing system is an outsourcing center 300, the processing system may read engagement rules to determine how, when, and what types of processing to perform (Act 406). The processing system processes the data accordingly (Act 408) and prepares and tracks meter reading, billing, and reporting data for each engagement (Act 410). The processing system reports the meter reading, billing, and reporting data to each engagement (Act 412) and continues processing meter data and verification data (Act 414).

The meter reading systems described above operate without time consuming, expensive, and trouble prone modifications to existing meters. The systems require neither a communication interface in the meter nor a connection of the meter to a communication network. Furthermore, the meter reading systems automatically check that the pictured meter is the correct meter (e.g., that the location of the pone 2 corresponds to a known meter location). Hence, the possibility of mistakes and fraud are reduced. The meter reading systems also provide checks for mobile meters by fixing one or more meter locations from which the meter images are accepted. In addition, biometrics, mobile phone identifiers, or other data may be used to verify the identity of the sender of the meter reading data and verification data, over and above any location check between the communication device and the meter.

Having thus described at least one illustrative embodiment of the invention, various alterations, modifications and improvements will readily occur to those skilled in the art. Such alterations, modifications, and improvements are intended to be within the spirit and scope of the invention. For example, the meters need not be utility meters. Instead, the meters may be any meter with an alphanumeric display, dials, needles, bars, or any other indicia. As another example, any wireless communication network or transportable machine readable medium may transfer the meter reading data and verification data to the server 5. In other words, the meter reading systems are not limited to cellular telephone networks. Accordingly, the foregoing description is by way of example only and is not intended to be limiting. The invention is limited only as defined in the following claims and the equivalents thereto.

The invention claimed is:

1. A method for remotely monitoring a meter with a meter display, the method comprising:
   receiving a picture of the meter display sent by a remote portable communication device;
   storing the picture in a datastore;
   analyzing the picture to determine a current value of the meter display;
   determining a first location of the remote portable communication device at the time that the picture was taken; and
   identifying the meter arranged at a different location from the first location of the remote portable communication device by:
      retrieving a second location of the meter; and
      comparing the second location of the meter with the first location of the remote communication device to determine whether the second location of the meter is within a pre-determined geographical area around the first location of the remote communication device;
accepting the current value when the second location is within the pre-determined geographical area around the first location; and
rejecting the current value when the second location is outside the pre-determined geographical area around the first location.

2. The method of claim 1, where receiving comprises: receiving a Multimedia Messaging Service (MMS) message comprising the picture.

3. The method of claim 1, where analyzing comprises: detecting alphanumeric characters, indicators, symbols, or any combination thereof in the picture and establishing a corresponding digital representation of the current value.

4. The method of claim 1, further comprising: determining a customer identifier based on the first location and matching the customer identifier to a customer record.

5. The method of claim 4, where the customer identifier comprises an address.

6. The method of claim 1, further comprising: receiving biometric data of an operator of the communication device.

7. The method of claim 6, further comprising applying a facial recognition technique to the biometric data to validate authenticity of the picture.

8. The method of claim 1, further comprising:
associating the meter with authorized data provider identifiers;
receiving a communication device identifier for the communication device; and
determining whether the authorized data provider identifiers include the communication device identifier.

9. The method of claim 1, where the first location comprises a wireless communication cell identifier.

10. The method of claim 1, further comprising: initiating transmission of an acknowledgement to the communication device.

11. The method of claim 10, where the acknowledgement comprises an acknowledgement of picture receipt, picture acceptance, picture interpretability, or any combination thereof.

12. The method of claim 10, where initiating transmission comprises: initiating transmission of a Multimedia Messaging Service (MMS) message comprising the acknowledgement.

13. The method of claim 1, where the meter is a mobile meter.

14. The method of claim 13, further comprising:
retrieving a valid fixed location for the mobile meter; and
determining whether the fixed location is within the pre-determined geographical area around the first location.

15. The method of claim 1, where the meter comprises a residential meter or an industrial meter.

16. A system for monitoring a meter including a meter display, the system comprising:
a communication interface operable to receive a picture of the meter display sent by a remote portable communication device;
a datastore operable to store the picture;
a processing system coupled to the datastore and operable to:
analyze the picture to determine a current value of the meter display;
determine a first location of the remote portable communication device at the time that the picture was taken;
retrieve a second location of the meter arranged at a different location from the first location of the remote portable communication device; and
compare the second location of the meter with the first location of the remote communication device to determine whether the second location of the meter is within a pre-determined geographical area around the first location of the remote communication device;
where the processing system is further operable to:
accept the current value when the second location is within the pre-determined geographical area around the first location; and
reject the current value when the second location is outside the pre-determined geographical area around the first location.

17. The system of claim 16, where the communication interface receives localization data for the communication device.

18. The system of claim 17, where the localization data comprises a wireless communication cell identifier or Global Positioning data or a combination thereof.

19. The system of claim 17, where the communication interface receives the localization data from a communication service provider for the communication device.

20. The system of claim 16, where the communication interface receives a communication device identifier for the communication device, and where the processing system is operable to determine whether the communication device identifier is an authorized communication device identifier for meter monitoring.

21. The system of claim 16, where:
the meter is a mobile meter;
the datastore comprises a valid fixed location for the mobile meter; and
the processing system is operable to determine whether the fixed location is within the pre-determined geographical area around the first location.

22. A method for remotely monitoring a meter including a meter display, the method comprising:
establishing a first location indicating a valid meter location for the meter;
connecting to a wireless communication infrastructure;
receiving a picture of the meter display sent by a remote portable wireless communication device through the wireless communication infrastructure;
receiving location data indicative of a location of the communication device when the picture of the meter display was taken, wherein the meter is arranged at a different location from the location of the communication device;
determining a second location at which the picture was taken based on the location data;
receiving a communication device identifier for the communication device;
determining whether the communication device identifier is an authorized communication device identifier for meter monitoring;
determining whether the second location matches the first location, comprising:
comparing the first location with the second location of the communication device to determine whether the first location is within a pre-determined geographical area around the second location of the communication device;
determining a current value of the meter display when the communication device identifier is an authorized communication device identifier and when the determined location matches the valid meter location, where determining the current value of the meter display comprises:
accepting the current value when the first location is within the pre-determined geographical area around the second location; and
rejecting the current value when the first location is outside the pre-determined geographical area around the second location; and
matching the meter and current value to a customer.

23. The method of claim 22, where the meter is a mobile meter and where the valid meter location is a fixed expected location for the mobile meter.

24. The method of claim 23, where the meter is a vehicle odometer, and where the valid meter location is a home location or a work location.

25. The method of claim 22, further comprising receiving biometric data of an operator of the communication device, and where matching comprises matching the meter and current value to the customer when the biometric data matches an authorized operator.

26. A method for remotely monitoring a mobile meter with a meter display, the method comprising:
receiving a picture of the mobile meter display sent by a remote portable communication device, wherein the mobile meter and the remote portable communication device are arranged in a selected vehicle;
storing the picture in a datastore;
analyzing the picture to determine a current value of the meter display;
storing a parameter that establishes a correspondence between the mobile meter and the selected vehicle, wherein the parameter comprises features of the selected vehicle and an expected environmental characteristic;
receiving first location data at which the picture was taken with the remote portable communication device;
receiving second location data of the selected vehicle;
accepting the current value of the meter display at least when:
(a) the first location data matches with the second location data;
(b) at least a portion of the picture stored in the datastore matches with the expected environmental characteristic; or
(c) at least a portion of the picture stored in the datastore matches with the features of the selected vehicle; and
rejecting the current value when none of (a), (b) and (c) is satisfied.

27. A system for monitoring a mobile meter including a meter display, the system comprising:
a communication interface operable to receive:
a picture of the meter display sent by a remote portable communication device;
first location data at which the picture was taken with the remote portable communication device;
second location data of a selected vehicle, wherein the mobile meter and the remote portable communication device are arranged in a selected vehicle;
a datastore operable to store the picture and a parameter that establishes a correspondence between the mobile meter and the selected vehicle, wherein the parameter comprises features of the selected vehicle and an expected environmental characteristic;
a processing system coupled to the datastore and operable to:
analyze the picture to determine a current value of the meter display;
accept the current value of the meter display at least when:
(a) the first location data matches with the second location data;
(b) at least a portion of the picture stored in the datastore matches with the expected environmental characteristic; or
(c) at least a portion of the picture stored in the datastore matches with the features of the selected vehicle
reject the current value of the meter display when none of (a), (b) and (c) is satisfied.

* * * * *